(12) United States Patent
Solomon et al.

(10) Patent No.: US 11,349,313 B2
(45) Date of Patent: May 31, 2022

(54) AUTHORIZATION IN A NETWORKED ELECTRIC VEHICLE CHARGING SYSTEM

(71) Applicant: ChargePoint, Inc., Campbell, CA (US)

(72) Inventors: James Solomon, Saratoga, CA (US); Milton Tormey, Los Altos, CA (US); Praveen Mandal, Los Altos Hills, CA (US); Richard Lowenthal, Cupertino, CA (US); Harjinder Bhade, San Jose, CA (US); David Baxter, Monte Sereno, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 17/073,252

(22) Filed: Oct. 16, 2020

(65) Prior Publication Data

US 2021/0036522 A1    Feb. 4, 2021

Related U.S. Application Data

(63) Continuation of application No. 16/195,484, filed on Nov. 19, 2018, now Pat. No. 10,833,509, which is a continuation of application No. 15/811,619, filed on Nov. 13, 2017, now Pat. No. 10,135,262, which is a continuation of application No. 13/736,890, filed on Jan. 8, 2013, now Pat. No. 9,819,200, which is a continuation of application No. 12/508,475, filed on Jul. 23, 2009, now Pat. No. 8,354,913.

(51) Int. Cl.
*H02J 7/00* (2006.01)
*G06F 21/31* (2013.01)

(52) U.S. Cl.
CPC ............... *H02J 7/00* (2013.01); *G06F 21/31* (2013.01); *Y02T 90/167* (2013.01); *Y04S 30/12* (2013.01)

(58) Field of Classification Search
CPC .......... H02J 7/00; G06F 21/31; Y02T 90/167; Y04S 30/12
See application file for complete search history.

(56) References Cited

U.S. PATENT DOCUMENTS

| | | |
|---|---|---|
| 4,839,640 A | 6/1989 | Ozer et al. |
| 5,802,199 A | 9/1998 | Pare et al. |
| 6,614,204 B2 | 9/2003 | Pellegrino et al. |

(Continued)

FOREIGN PATENT DOCUMENTS

| | | |
|---|---|---|
| WO | 2008/015893 A1 | 2/2008 |
| WO | 2007/141543 A3 | 5/2008 |

OTHER PUBLICATIONS

Corrected Notice of Allowability, U.S. Appl. No. 16/195,484, dated Aug. 25, 2020, 4 pages.

(Continued)

*Primary Examiner* — Nabil H Syed
(74) *Attorney, Agent, or Firm* — Nicholson De Vos Webster & Elliott LLP

(57) ABSTRACT

Networked electric vehicle charging stations for charging electric vehicles are coupled with an electric vehicle charging station network server that performs authorization for charging session requests while the communication connection between the charging stations and the server are operating correctly. When the communication connection is not operating correctly, the networked electric vehicle charging stations enter into a local authorization mode to perform a local authorization process for incoming charging session requests.

15 Claims, 12 Drawing Sheets

(56) References Cited

U.S. PATENT DOCUMENTS

| | | |
|---|---|---|
| 2004/0095230 A1 | 5/2004 | Li et al. |
| 2007/0188303 A1 | 8/2007 | Faro et al. |
| 2008/0041943 A1 | 2/2008 | Radicella et al. |
| 2008/0136584 A1 | 6/2008 | Ehrman et al. |
| 2009/0021213 A1 | 1/2009 | Johnson |
| 2010/0010698 A1 | 1/2010 | Iwashita et al. |
| 2010/0241560 A1 | 9/2010 | Landau-Holdsworth et al. |

OTHER PUBLICATIONS

Final Office Action U.S. Appl. No. 12/508,475, dated Feb. 25, 2011, 17 pages.
Final Office Action, U.S. Appl. No. 12/508,475, dated Feb. 17, 2012, 19 pages.
Final Office Action, U.S. Appl. No. 13/736,890, dated Dec. 11, 2013, 11 pages.
Final Office Action, U.S. Appl. No. 13/736,890, dated Oct. 27, 2014, 11 pages.
Final Office Action, U.S. Appl. No. 15/811,619, dated May 2, 2018, 14 pages.
Final Office Action, U.S. Appl. No. 16/195,484, dated Mar. 17, 2020, 19 pages.
Non-Final Office Action, U.S. Appl. No. 12/508,475, dated Aug. 26, 2011, 20 pages.
Non-Final Office Action, U.S. Appl. No. 12/508,475, dated Oct. 14, 2010, 15 pages.
Non-Final Office Action, U.S. Appl. No. 13/736,890, dated Jun. 24, 2014, 12 pages.
Non-Final Office Action, U.S. Appl. No. 13/736,890, dated May 31, 2013, 17 pages.
Non-Final Office, U.S. Appl. No. 15/811,619, dated Jan. 4, 2018, 22 pages.
Notice of Allowance, U.S. Appl. No. 12/508,475, dated Sep. 14, 2012, 7 pages.
Notice of Allowance, U.S. Appl. No. 13/736,890, dated Jul. 10, 2017, 8 pages.
Notice of Allowance, U.S. Appl. No. 13/736,890, dated Mar. 22, 2017, 8 pages.
Notice of Allowance, U.S. Appl. No. 16/195,484, dated Jun. 30, 2020, 6 pages.
Notice of Allowance, U.S. Appl. No. 15/811,619, dated Jul. 17, 2018, 5 pages.

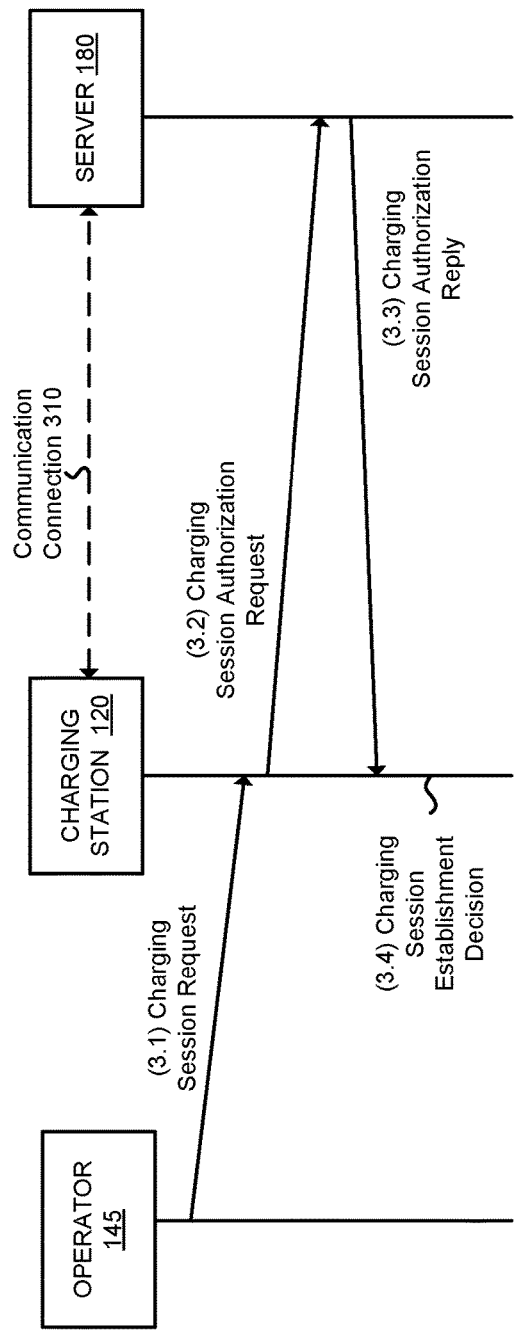
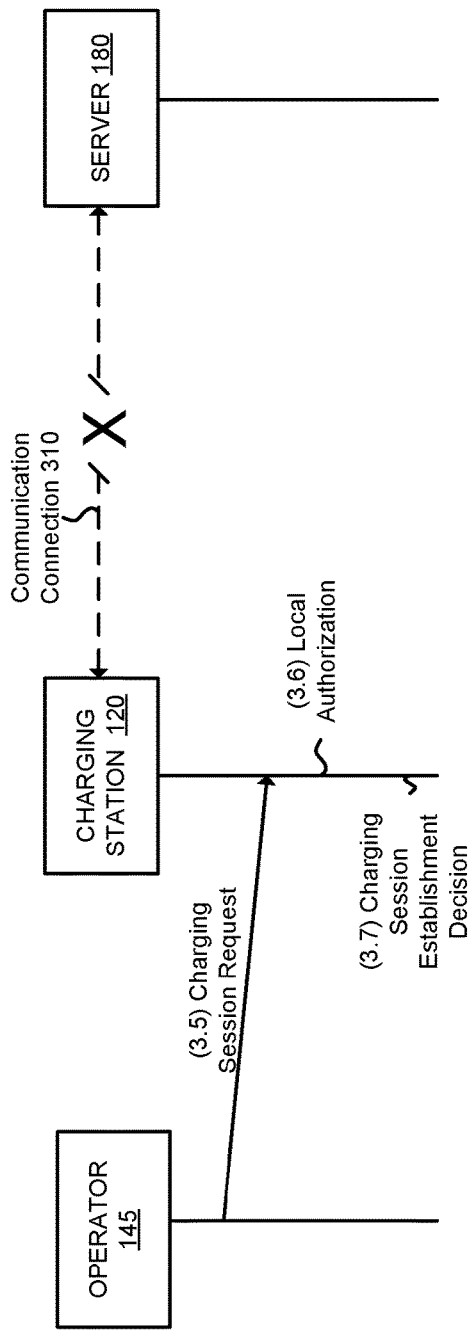
FIG. 3A
FIG. 3B

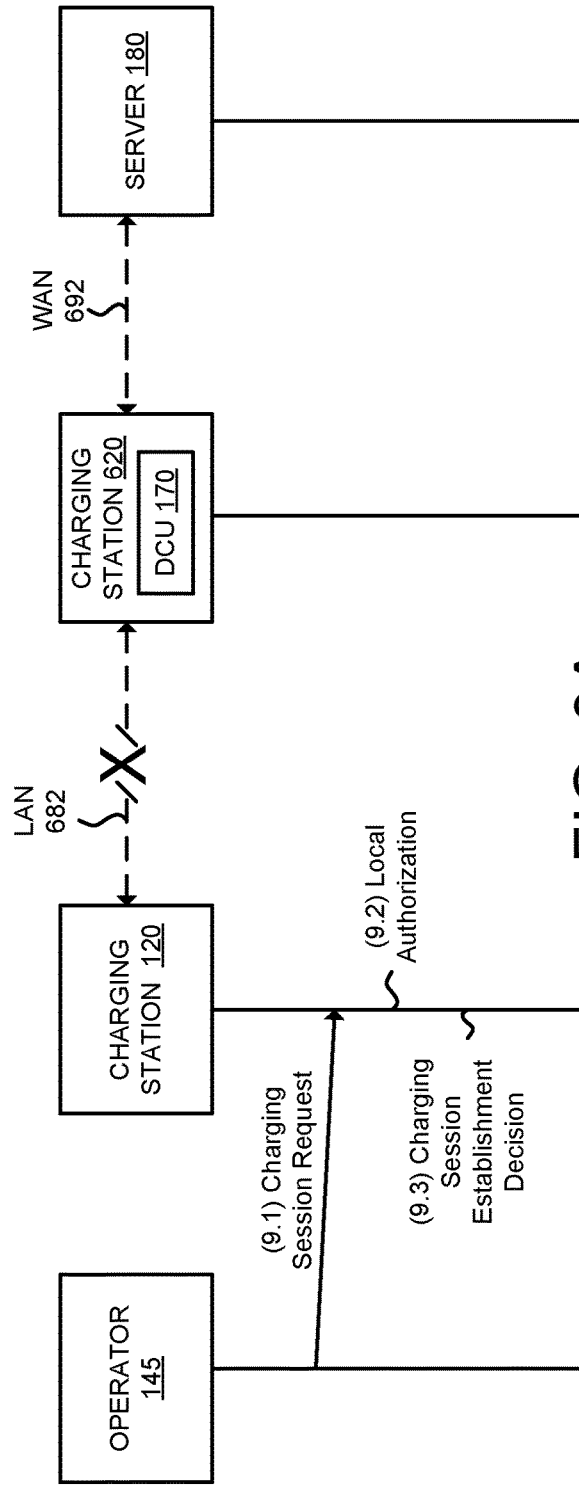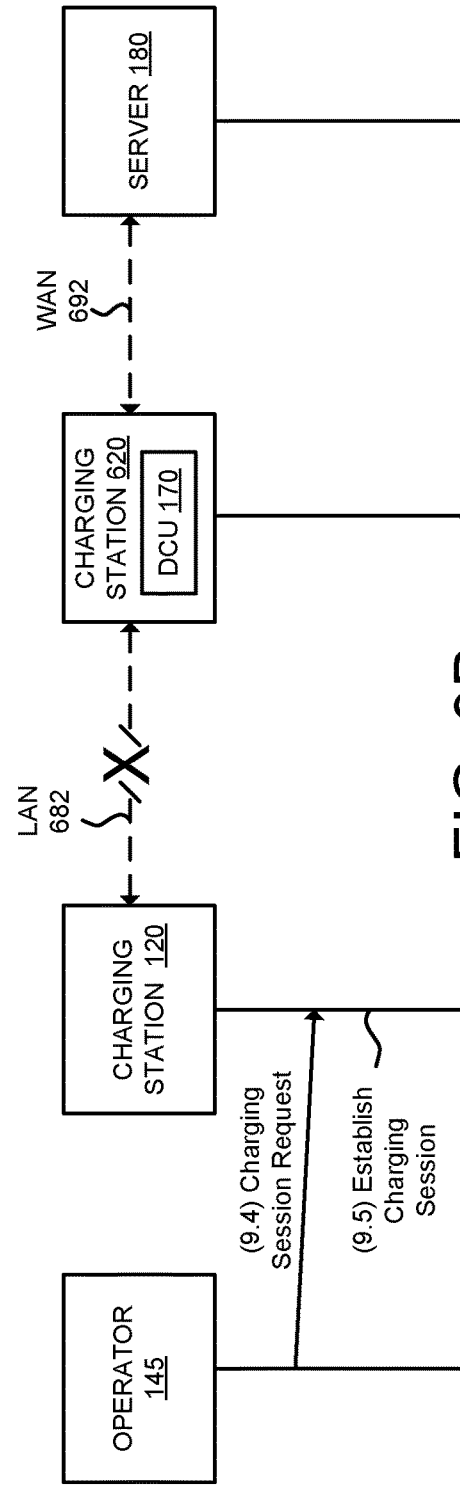

AUTHORIZATION IN A NETWORKED ELECTRIC VEHICLE CHARGING SYSTEM

CROSS-REFERENCE TO RELATED APPLICATIONS

This Application is a continuation of Ser. No. 16/195,484, filed Nov. 19, 2018, which is a continuation of application Ser. No. 15/811,619, filed Nov. 13, 2017, Now U.S. Pat. No. 10,135,262, which is a continuation of application Ser. No. 13/736,890, filed Jan. 8, 2013, Now U.S. Pat. No. 9,819,200, which is continuation of application Ser. No. 12/508,475, filed Jul. 23, 2009, now U.S. Pat. No. 8,354,913, which is hereby incorporated by reference.

BACKGROUND

Field

Embodiments of the invention relate to the field of charging stations for electric vehicles, and more specifically to authorization in a networked electric vehicle charging system.

Background

Electric vehicle charging stations are typically used to provide charging points for electric vehicles (e.g., electric battery powered vehicles, gasoline/electric battery powered vehicle hybrid, etc.). For example, charging stations may be located in designated charging locations (e.g., similar to locations of gas stations), parking spaces (e.g., public parking spaces and/or private parking space), etc. Some charging stations allow anyone to access and use the charging stations while other charging stations allow only authorized operators to use the charging station and charge their electric vehicles.

BRIEF DESCRIPTION OF THE DRAWINGS

The invention may best be understood by referring to the following description and accompanying drawings that are used to illustrate embodiments of the invention. In the drawings:

FIG. 3A illustrates an exemplary profile based authorization procedure when the charging station has network connectivity to the charging station network server according to one embodiment of the invention;

FIG. 3B illustrates a local authorization procedure when the charging station has lost network connectivity to the charging station network server according to one embodiment of the invention;

FIG. 9A illustrates an authorization procedure when the charging station has lost network connectivity with the charging station network server due to a loss of connectivity between the charging station and the gateway data control unit according to one embodiment of the invention;

FIG. 9B illustrates an alternative authorization procedure when the charging station has lost network connectivity with the charging station network server due to a loss of connectivity between the charging station and the gateway data control unit according to one embodiment of the invention;

DETAILED DESCRIPTION

Figure 1:
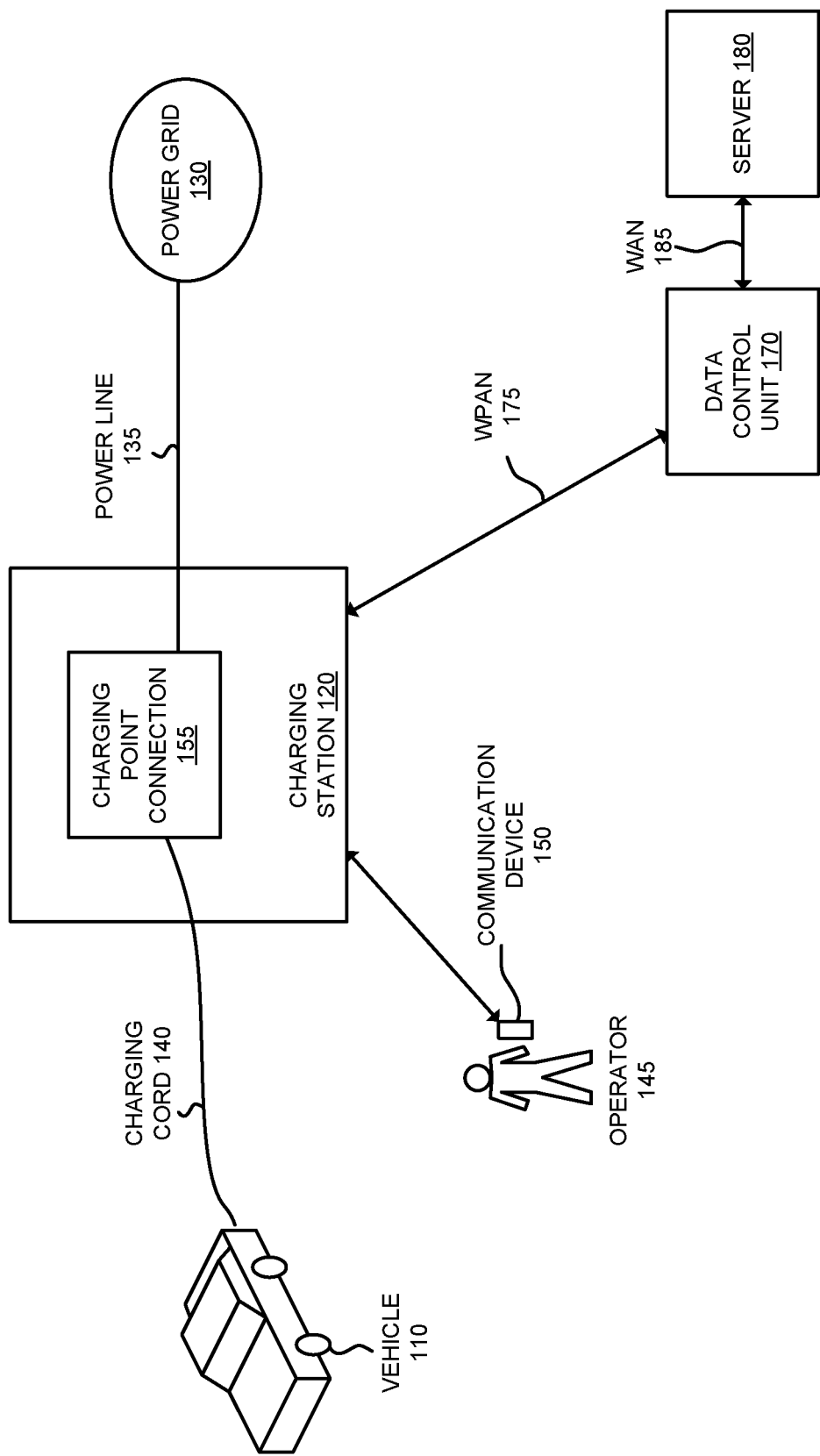
FIG. 1 illustrates an exemplary charging system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the Figures can be implemented using code and data stored and executed on one or more computing devices (e.g., charging stations, charging station network servers, etc.). As used herein, a charging station is a piece of equipment, including hardware and software, to charge electric vehicles. Such computing devices store and communicate (internally and with other computing devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given device typically stores code and/or data for execution on the set of one or more processors of that device. Of course, one or more parts of an embodiment of the invention may be implemented using different combinations of software, firmware, and/or hardware.

The present invention will now be described in detail with reference to the drawings, which are provided as illustrative examples of the invention so as to enable those skilled in the art to practice the invention. Notably, the Figures and examples below are not meant to limit the scope of the present invention to a single embodiment, but other embodiments are possible by way of interchange of some or all of the described or illustrated elements.

Electric vehicle charging stations for charging electric vehicles are networked with a charging station network server that performs authorization of vehicle operators (among other things) during regular operation. The charging stations enter into a local authorization mode upon losing network connectivity with the charging station network server. In the local authorization mode, the charging stations perform a local authorization procedure that allows a certain subset of operators to use the charging station while network connectivity is down.

In one embodiment, the charging stations store a list of unique identifiers (e.g., identifiers transmitted by an RFID enabled smartcard (e.g., unique identifiers (UID) burned into the smartcards, passwords or other information programmed into the smartcards, etc.), usernames, passwords, etc.) that are authorized to use the charging station while network connectivity to the server is down (e.g., a whitelist of identifiers). In such an embodiment, upon receiving a charging session request with one of those unique identifiers, a charging station locally authorizes the charging session. The charging station denies those charging session requests that do not include one of the identifiers on the list.

In another embodiment, the charging stations store a list of unique identifiers (e.g., identifiers transmitted by an RFID enabled smartcard, usernames, etc.) that are not authorized to use the charging station while network connectivity to the server is down (e.g., a blacklist of identifiers). In such an embodiment, upon receiving a charging session request that includes an identifier that is not on the list, a charging station locally authorizes the charging session. The charging station denies those charging session requests that include one of the identifiers on the list.

In some embodiments the charging stations can each store multiple lists of unique identifiers. For example, different lists can be used at different times of the day (e.g., a list to be used during peak charging hours, a list to be used during non-peak charging hours, etc.). In another embodiment, the charging station stores multiple lists for multiple service providers (e.g., different list(s) for each service provider that contains the identifiers associated with their customers that are or are not allowed to be locally authenticated).

While in the local authorization mode, the charging stations store state related to the charging session (e.g., the RFID identifier, the charging session duration, the amount of energy dispensed (e.g., kWh), etc.). Upon detecting that the network is restored, the stored state data is then transmitted to the charging station network server.

FIG. 1 illustrates an exemplary charging system according to one embodiment of the invention. The charging system illustrated in FIG. 1 includes the networked electric vehicle charging station 120 (hereinafter referred to as the "charging station" 120), which is coupled with the power grid 130 over the power line 135. The power grid 130 can be owned and/or operated by local utility companies or owned and/or operated by private persons/companies.

The charging station 120 is also coupled with the data control unit 170 over the WPAN (Wireless Personal Area Network) line 175 (e.g., Bluetooth, ZigBee, etc.) or other LAN (Local Area Network) links (e.g., Ethernet, PLC, WiFi, etc.). The data control unit 170 is coupled with the electric vehicle charging station network server 180 (hereinafter "server" 180) over the WAN (Wide Access Network) connection 185 (e.g., Cellular (e.g., CDMA, GPRS, etc.), WiFi Internet connection, Plain Old Telephone Service modem, leased line, etc.). The data control unit 170 acts as a gateway to the server 180 and relays messages and data between the charging station 120 and the server 180. According to one embodiment of the invention, the data control unit 170 can be included as part of another charging station as will be described in more detail with reference to FIG. 6. Of course it should be understood that the data control unit 170 can be a separate device not included in a charging station or can be included in the charging station 120. In some embodiments, the charging station 120 is coupled with the server 180 without a DCU.

Operators of electric vehicles use the charging station 120 to charge their electric vehicles. For example, the electricity storage devices (e.g., batteries, supercapacitors, etc.) of electric vehicles (e.g., electric powered vehicles, gasoline/electric powered vehicle hybrids, etc.) may be charged through use of the charging station 120. It should be understood that electric vehicle operators may include drivers of electric vehicles, passengers of electric vehicles, and/or service personnel of electric vehicles. In one embodiment, the operators of electric vehicles provide their own charging cord to charge their electric vehicle (e.g., the charging cord 140 belongs to the electric vehicle operator 145), while in other embodiments the charging station 120 includes an attached charging cord (e.g., the charging cord 140 is fixably attached to the charging station 120).

In one embodiment, the charging station 120 can charge in a dual mode at different voltages (e.g., 120V and 240V). By way of example, a fixably attached charging cord is typically used in a higher voltage mode (e.g., 240V) and an unattached charging cord is typically inserted into a power receptacle of the charging station 120 in a lower voltage mode (e.g., 120V).

In some embodiments, the flow of electrical power can be in either direction on the power line 135. In other words, the electric vehicle 110 can be charged from the power grid 130 or the power grid 130 can receive power from the electric vehicle 110 (hereinafter referred to as "vehicle-to-grid" (V2G). V2G is particularly attractive for electric vehicles which have their own charging devices, such as battery electric vehicles with regenerative braking and plug-in hybrid vehicles. Thus, in some embodiments of the invention, the electric vehicle 110 may consume electricity from the power grid 130 as well as transfer electricity to the power grid 130.

The charging station 120 controls the application of electricity between the charging point connection 155 and the power grid 130 (e.g., energizes and de-energizes the charging point connection 155). In one embodiment, the charging point connection 155 is a power receptacle or an attached charging cord (e.g., thus the charging station 120 can energize/de-energize the power receptacle or the attached charging cord). The power receptacle can be any number of types of receptacles such as receptacles conforming to the NEMA (National Electrical Manufacturers Association) standards 5-1 5, 5-20, and 14-50 or other standards (e.g., BS 1363, CEE7, etc.) and may be operating at different voltages (e.g., 120V, 240V, 230V, etc.).

The electric vehicle operator 145 may use the communication device 150 to initiate and request a charging session for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.)), ZigBee device, etc. The communication device 150 communicates unique operator-specific information (e.g., operator identification information, etc.) to the charging station 120 (either directly or indirectly through the server 180). In some embodiments, electric vehicle operator 145 may use the communication device 150 to monitor the charging status of the electric vehicle 110. In one embodiment, the communication device 150 may be coupled with the electric vehicle 110. In case the communication device 150 is a RFID device, the operator 145 presents the communication device 150 to the charging station 120 to initiate a charging session for the vehicle 110.

Based on the information communicated by the communication device 150, a determination is made whether the electric vehicle operator 145 is authorized to use the charging station 120. In one embodiment, the authorization process includes determining whether the vehicle operator 145 is associated with an account in good standing. In one embodiment, responsive to determining that the electric vehicle operator 145 is authorized to use the charging station 120, the charging station 120 energizes the charging point connection 155 thereby allowing electricity to flow between the electric vehicle 110 and the power gird 130 (assuming that the electric vehicle 110 is properly connected with the charging point connection 155).

It should be understood that the operator 145 may request a charging session from the charging station 120 differently in some embodiments of the invention. For example, the operator 145 may interact with a payment station coupled with the charging station 120, which may then send appropriate instructions to the charging station 120 regarding the charging of the vehicle 110 (e.g., instructions to energize the charging point connection 155, etc.). The payment station may function similarly to a payment station for a parking space. In addition, the payment station coupled with the charging station may be used both for parking payment and charging payment.

Figure 2:
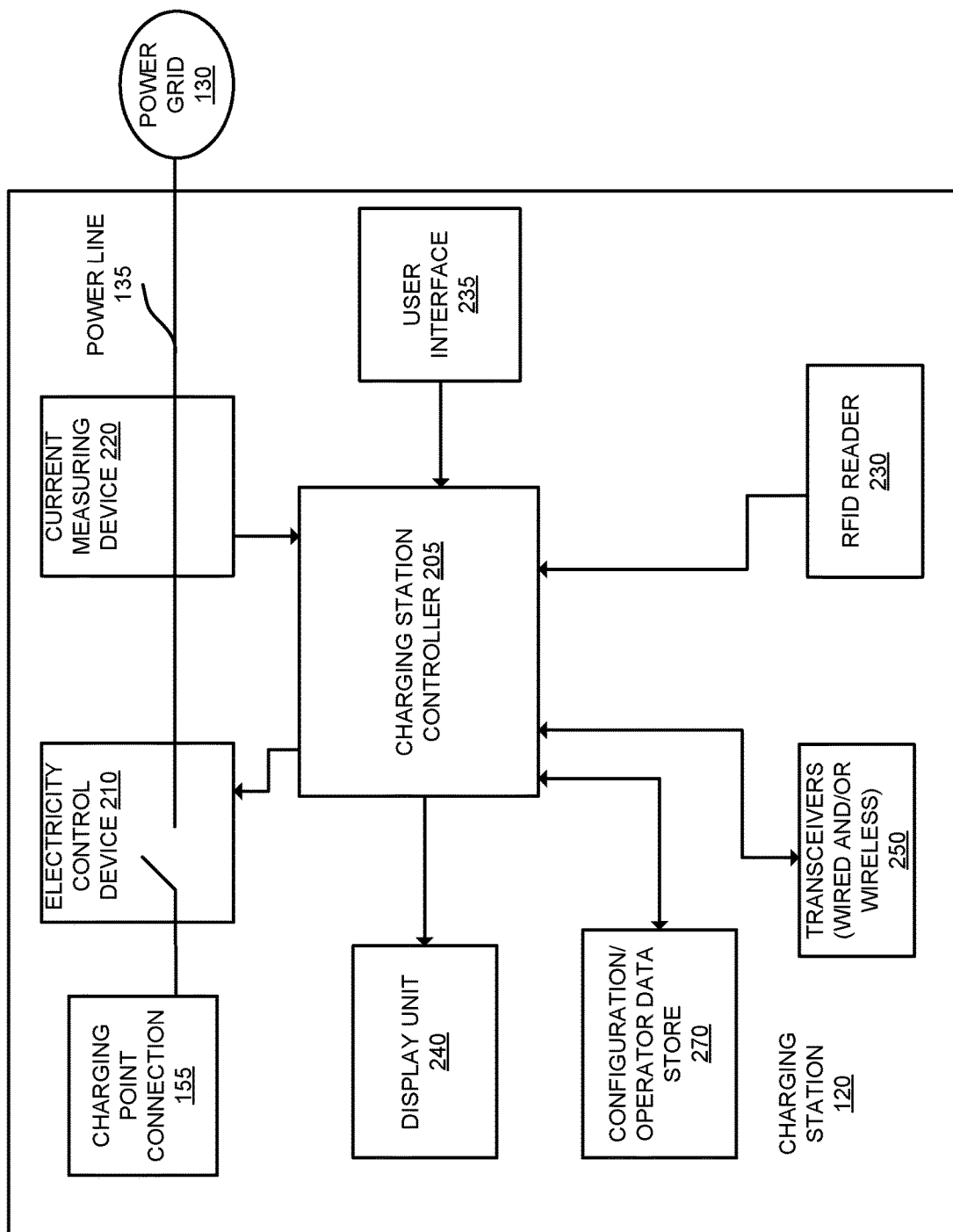
FIG. 2 illustrates an exemplary embodiment of the charging station illustrated in FIG. 1 according to one embodiment of the invention.

FIG. 2 illustrates an exemplary embodiment of the charging station 120 according to one embodiment of the invention. The charging station 120 includes the charging point connection 155, charging station controller 205, the electricity control device 210, the current measuring device 220, the RFID reader 230, the user interface 235, the display unit 240, and one or more transceivers 250 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)). It should be understood that FIG. 2 illustrates an exemplary architecture of a charging station, and other, different architectures may be used in embodiments of the invention described herein. For example, some implementations of charging stations may not include a user interface, an RFID reader, or a connection to a network.

The RFID reader 230 reads RFID tags from RFID enabled devices (e.g., smartcards, key fobs, etc., embedded with RFID tag(s)) of operators that want to use the charging station 120. For example, the operator 145 may wave/swipe the mobile communication device 150 (if an RFID enabled device) near the RFID reader 230 to request a charging session from the charging station 120.

The RFID reader 230 passes the information read to the charging station controller 205. The charging station controller 205 is programmed to include instructions that establish charging sessions with the vehicles. In one embodiment, the operator 145 is authenticated and authorized based on the information the RFID reader 230 receives. While in one embodiment of the invention the charging station 120 locally stores authorization information (e.g., in the configuration/operator data store 270), in other embodiments of the invention the charging station controller 205 transmits an authorization request to a remote device (e.g., the server 180) via one of the transceivers 250. For example, the charging station controller causes an authorization request to be transmitted to the data control unit 170 over a WPAN transceiver (e.g., Bluetooth, ZigBee) or a LAN transceiver. The data control unit 170 relays the authorization request to the server 180.

In some embodiments, in addition to or in lieu of vehicle operators initiating charging sessions with RFID enabled devices, vehicle operators may use the user interface 235 to initiate charging sessions. For example, vehicle operators may enter in account and/or payment information through the user interface 235. For example, the user interface 235 may allow the operator 145 to enter in a username/password (or other information) and/or payment information. In other embodiments of the invention, vehicle operators may request charging sessions through devices remote to the charging station 120 (e.g., payment stations coupled with the charging stations).

The charging station controller 205 causes the charging point connection 155 to be energized after a vehicle operator has been authorized. For example, the charging station controller 205 causes the electricity control device 210 to complete the connection of the power line 135 to the power grid 130. In one embodiment, the electricity control device 210 is a solid-state device that is controlled by the charging station controller 205 or any other device suitable for controlling the flow of electricity.

The current measuring device 220 measures the amount of current that is flowing on the power line 135 through the charging point connection 155 (e.g., between the vehicle 110 and the charging station 120). In some embodiments, in addition to electric vehicles being able to be charged from the power grid 130, these electric vehicles can be a source of electric power to be transferred to the power grid 130 (vehicle-to-grid (V2G)). While in one embodiment of the invention the current measuring device 220 measures flow of current, in an alternative embodiment of the invention the current measuring device 220 measures power draw. The current measuring device 220 may include or be coupled with an induction coil or other devices suitable for measuring current. The current measuring device 220 is coupled with the charging station controller 205. The charging station controller 205 is programmed with instructions to monitor the current data output from the current measuring device 220 and to calculate the amount of electricity being used over a given time period.

The display unit 240 is used to display messages to the operator 145 (e.g., charging status, confirmation messages, error messages, notification messages, etc.). The display unit 240 may also display parking information if the charging station 120 is also acting as a parking meter (e.g., amount of time remaining in minutes, parking violation, etc.).

The configuration/operator data store 270 stores configuration information which may be set by administrators, owners, or manufacturers of the charging station 120. As will be described in greater detail later herein, the configuration/operator data store 270 can also store one or more local authorization lists and one or more restricted authorization lists.

The authorization process for authorizing vehicle operators can be performed in different ways in different embodiments of the invention. In one embodiment, while the network connection between the charging station 120 and the server 180 is operating correctly, the charging station 120 transmits a charging session authorization request, which includes the information read from the communication device 150, to the server 180 for authorization. FIG. 3A illustrates the server 180 performing a profile based authorization procedure according to one embodiment of the invention. As illustrated in FIG. 3A, the charging station 120 and the server 180 communicate (e.g., exchange messages) over the communication connection 310 (e.g., a WAN connection as a cellular connection (e.g., CDMA, GPRS, etc.)).

At operation 3.1, the charging station 120 receives a charging session request from the electric vehicle operator 145. The request may be received via the mobile communication device 150 or though other means. The charging session request includes an identifier that is associated with the electric vehicle operator 145 (e.g., a RFID number, a username, an email, a phone number, etc.) Sometime after receiving the charging session request, the charging station 120 generates a charging session authorization request and transmits the authorization request to the server 180 at operation 3.2. The charging session authorization request includes the identifier (or at least a portion of the identifier) that was included in the charging session request (e.g., the identifier that is associated with the electric vehicle operator 145). The authorization request can also include additional information (e.g., charging station identifier, time of day, etc.).

Sometime after receiving the charging session authorization request, the server 180 performs a profile based authorization process to determine whether the electric vehicle operator 145 is authorized to use the charging station 120. The profile based authorization process is based on a profile associated with the identifier included in the charging session authorization request. The profiles include operator account information (which can indicate whether the account is in good standing, the number of charging sessions remaining, type of account (e.g., privilege of account including any time and/or date restrictions), etc.), operator contact information (e.g., operator name, mailing address, email address, telephone number, micro-blogging account information, etc.), etc.

Figure 4:
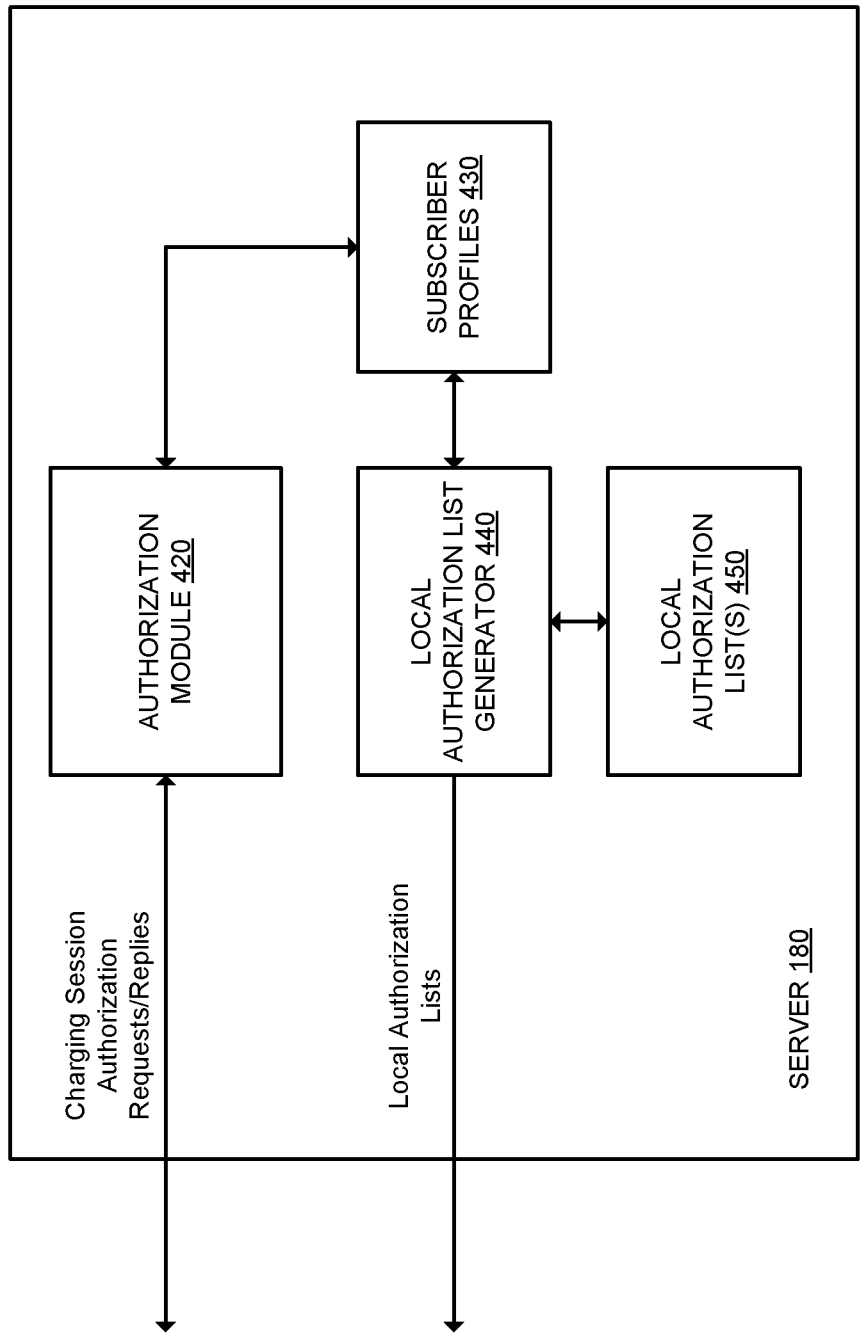
FIG. 4 illustrates an exemplary charging station network server that performs profile based authorization for charging sessions according to one embodiment of the invention.

FIG. 4 illustrates an exemplary server 180 that performs profile based authorization for charging sessions. As illustrated in FIG. 4, the server 180 includes the authorization module 420, the subscriber profiles 430, the local authorization list generator 440, and the local authorization list(s) 450. The authorization module 420 receives charging session authorization requests and determines whether to authorize the charging session based on the subscriber profiles 430, which include operator account information (e.g., operator identifiers, account standing, type of account (e.g., privilege of account including any time of day restrictions)) and can also include operator contact information (e.g., name, mailing address, email address, telephone number, micro-blogging account information, etc.).

In one embodiment, the server 180 also includes a subscriber portal (available through the Internet) which allows subscribers (owners and operators of electric vehicles) to register for service (which may include providing information regarding their electric vehicles, providing payment information, providing contact information, etc.) and perform other functions (e.g., pay for charging sessions, determine availability of charging stations, check the charging status of their electric vehicle(s), etc.). The registration process can be used to build the subscriber profiles 430.

As will be described in greater detail later herein, in one embodiment the server 180 also includes one or more restricted lists which can be configured by hosts or administrators of the charging stations using a host portal that is available through the Internet.

After determining whether the operator is authorized to use the charging station based on their profile, the authorization module 420 generates a charging session authorization reply and transmits that reply message to that charging station. The charging session authorization reply includes an indication of whether the operator is authorized to use the charging station.

Referring back to FIG. 3A, sometime after performing the authorization procedure, the server 180 generates and transmits a charging session authorization reply to the charging station 120 at operation 3.3. Sometime after receiving the charging session authorization reply, the charging station 120 determines whether to establish a charging session for the operator 145 (including energizing the charging point connection 155) based on the received charging session authorization reply at operation 3.4. If the charging session authorization reply indicates that the operator 145 is authorized to use the charging station 120, the charging station 120 establishes a charging session including energizing the charging point connection 155. If the charging session authorization reply indicates that the operator 145 is not authorized to use the charging station 120, the charging station 120 declines the charging session request (and thus does not energize the charging point connection 155).

While FIG. 3A illustrates an authorization procedure when the charging station 120 has network connectivity to the server 180 (e.g., when the communication connection 310 is operating correctly), in some embodiments the charging station 120 performs a local authorization procedure if it does not have network connectivity to the server 180 (e.g., the communication connection 310 is operating incorrectly). FIG. 3B illustrates an authorization procedure where the charging station 120 has lost network connectivity with the server 180 (the communication connection 310 has been broken) according to one embodiment of the invention. At operation 3.5, the charging station 120 receives a charging session request from the electric vehicle operator 145. The charging session request in operation 3.5 is similar to the charging session request received in operation 3.1 (e.g., the charging session request includes an identifier associated with the operator 145).

Since the communication connection 310 between the charging station 120 and the server 180 is down, at operation 3.6 the charging station 120 performs a local authorization procedure. In one embodiment, the local authorization procedure includes comparing at least a portion of the identifier included in the charging session request against one or more local authorization lists to determine whether to allow a charging session for the operator 145.

In one embodiment, the server 180 distributes a list of identifiers to the charging station 120 that are authorized to use the charging station 120 (i.e., a whitelist of identifiers). If the identifier included in the charging session request is on the whitelist, then the charging station 120 establishes a charging session for the operator 145 including energizing the charging point connection 155 at operation 3.7. If the identifier is not on the whitelist, then the charging station 120 declines the charging session request and does not establish a charging session at operation 3.7.

The identifiers included on the whitelist can be chosen in different ways in different embodiments. As one example, the identifiers selected to be on the whitelist can be those that are associated with a particular account type (e.g., a charge anytime account type, etc.). Additionally, in some embodiments there is a different whitelist for different time periods of the day (e.g., a whitelist for non-peak hours, a whitelist for peak hours, a whitelist for overnight hours, etc.).

In another embodiment, the server 180 distributes a list of identifiers to the charging station 120 that are not authorized to use the charging station 120 (i.e., a blacklist of identifiers). If the identifier included in the charging session request is on the blacklist, then the charging station 120 declines the charging session request and does not establish a charging session at operation 3.7. However, if the identifier is not on the blacklist, then the charging station 120 establishes a charging session for the operator 145 including energizing the charging point connection 155 at operation 3.7.

Similar to the identifiers on the whitelists, the identifiers included on the blacklist can be chosen in different ways in different embodiments. As one example, the identifiers selected to be on the blacklist can be those that are associated with a particular account type (e.g., a non-peak hours account, etc.). As another example, the identifiers selected to be on the blacklist include can be those that are associated with accounts that are not in good standing (e.g., a credit card has previously been declined, the account has not been paid, etc.). Additionally, in some embodiments, there is a different blacklist for different time periods of the day (e.g., a blacklist for non-peak hours, a blacklist for peak hours, a blacklist for overnight hours, etc.).

While in one embodiment the entire identifier is compared and searched for on the local notification lists, in other embodiments only a portion of the identifier is compared to the local notification lists. For example, in some embodiments the identifiers associated with vehicle operators include a portion that is common to an organization, business, group, department, locality, or other organizational section. For example, vehicle operators of a police department can share at least a portion of the identifier (e.g., an organizational section portion of the identifier). In such an embodiment, the local notification list(s) include only one or more organizational sections that are authorized to use the charging station and the organizational section portion of the identifiers included in the charging session requests are compared to the local notification list(s).

Referring to FIG. 4, the server 180 includes the local authorization list generator 440 and the local authorization list(s) 450. The local authorization list generator 440 generates local authorization lists (e.g., one or more whitelists and/or one or more blacklists for the charging station 120). In one embodiment, the local authorization list generator 440 generates the lists based on the information in the subscriber profiles 430. The local authorization list generator 440 can generate and/or update a local authorization list each time the subscriber profiles is updated and/or periodically (e.g., once a day, once a week, once a month, etc.).

Figure 5:
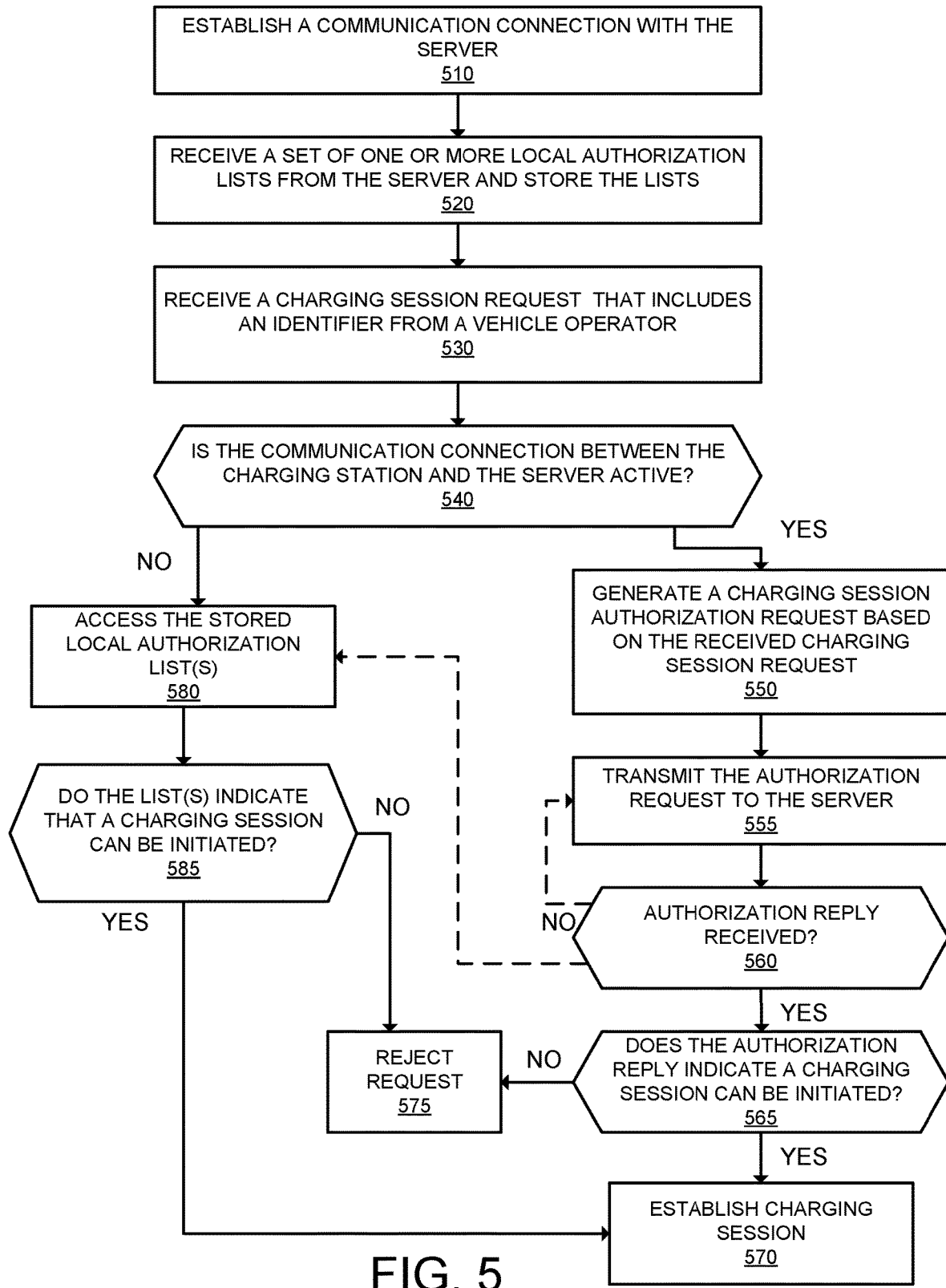
FIG. 5 is a flow diagram illustrating exemplary operations for authorizing operators that use charging stations according to one embodiment of the invention.

FIG. 5 is a flow diagram illustrating exemplary operations for authorizing operators that use charging stations according to one embodiment of the invention. FIG. 5 will be described with reference to the exemplary embodiment of FIG. 1. However, it should be understood that the operations of FIG. 5 can be performed by embodiments of the invention other than those discussed with reference to FIG. 1 and the embodiments discussed with reference to FIG. 1 can perform operations different than those discussed with reference to FIG. 5. According to one embodiment, the operations described in reference to FIG. 5 are performed by charging stations (e.g., the charging station 120).

At block 510, a communication connection is established between the charging station 120 and the server 180. For example, the communication connection is established over a WAN communication link. Flow moves from block 510 to block 520 where the charging station 120 receives a set of one or more local authorization lists from the server 180 and stores those lists. While in one embodiment the charging station 120 receives the local authorization lists directly from the server 180, in other embodiments the local authorization lists are transmitted to one or more data control units (e.g., the data control unit 170) which in turn distributes the local authorization lists to the charging station 120. Flow moves from block 520 to block 530.

At block 530, the charging station 120 receives a charging session request that includes an identifier from a vehicle operator (e.g., an identifier associated with the operator 145). The charging session request can be received through the communication device 150 or through other means. Flow moves from block 530 to block 540.

At block 540, a determination is made whether the communication connection between the charging station 120 and the server 180 is active. If the communication connection is not active, then flow moves to block 580. If the communication connection is active, then flow moves to block 550. It should be understood that when they communication connection between the charging station 120 and the server 180 is not active, messages cannot typically be exchanged between the charging station 120 and the server 180. The communication connection can be down because of numerous reasons.

With reference to block 550, the charging station 120 generates a charging session authorization request based on the received charging session request. For example the charging session authorization request can include the identifier that was included in the charging session request. The charging session authorization request can also include additional information (e.g., date and time of the received charging session request, etc.). Flow moves from block 550 to block 555 where the charging station 120 transmits the authorization request to the server 180. Flow moves from block 555 to block 560.

At block 560, a determination is made whether a charging session authorization reply has been received from the server 180. If the charging station 120 does not receive a charging session authorization reply from the server 180 after a certain amount of time, the charging station 120 can retransmit the authorization request to the server 180 (block 555). If the charging station 120 has transmitted the authorization request to the server 180 one or more times without a reply, flow can move to block 580. Flow moves from block 560 to block 565 when a charging session authorization reply is received.

At block 565 the charging station 120 determines if the charging session authorization reply indicates that a charging session can be initiated. If the reply indicates a charging session can be initiated, then flow moves to block 570 where the charging station 120 establishes a charging session including energizing the charging point connection 155. If the authorization reply indicates a charging session cannot be initiated, then flow moves to block 575 where the request is rejected.

If the communication connection between the charging station 120 and the server 180 is not active (the communication connection is not functioning correctly), the charging station 120 enters a local authorization mode to locally perform an authorization procedure. With reference to block 580 (the communication connection between the charging station 120 and the server 180 is not active and/or the server 180 has not replied to an authorization request), the charging station 120 accesses one or more stored local authorization lists. Flow moves from block 580 to block 585.

At block 585, it is determined whether the local authorization list(s) indicate that a charging session can be initiated. For example, the charging station 120 searches the one or more local authorization lists for the identifier included in the charging session request. As described above, the local authorization lists can be whitelists (a set of one or more identifiers that are authorized to use the charging station 120) or blacklists (a set of one or more identifiers that are not authorized to use the charging station 120). Also as described above, there may be different local authorization lists for different times of the day, etc. If the charging session cannot be initiated, then flow moves to block 575 where the request is rejected. However if the lists indicate that the charging session can be initiated, then flow moves to block 570 where a charging session is established.

Figure 6:
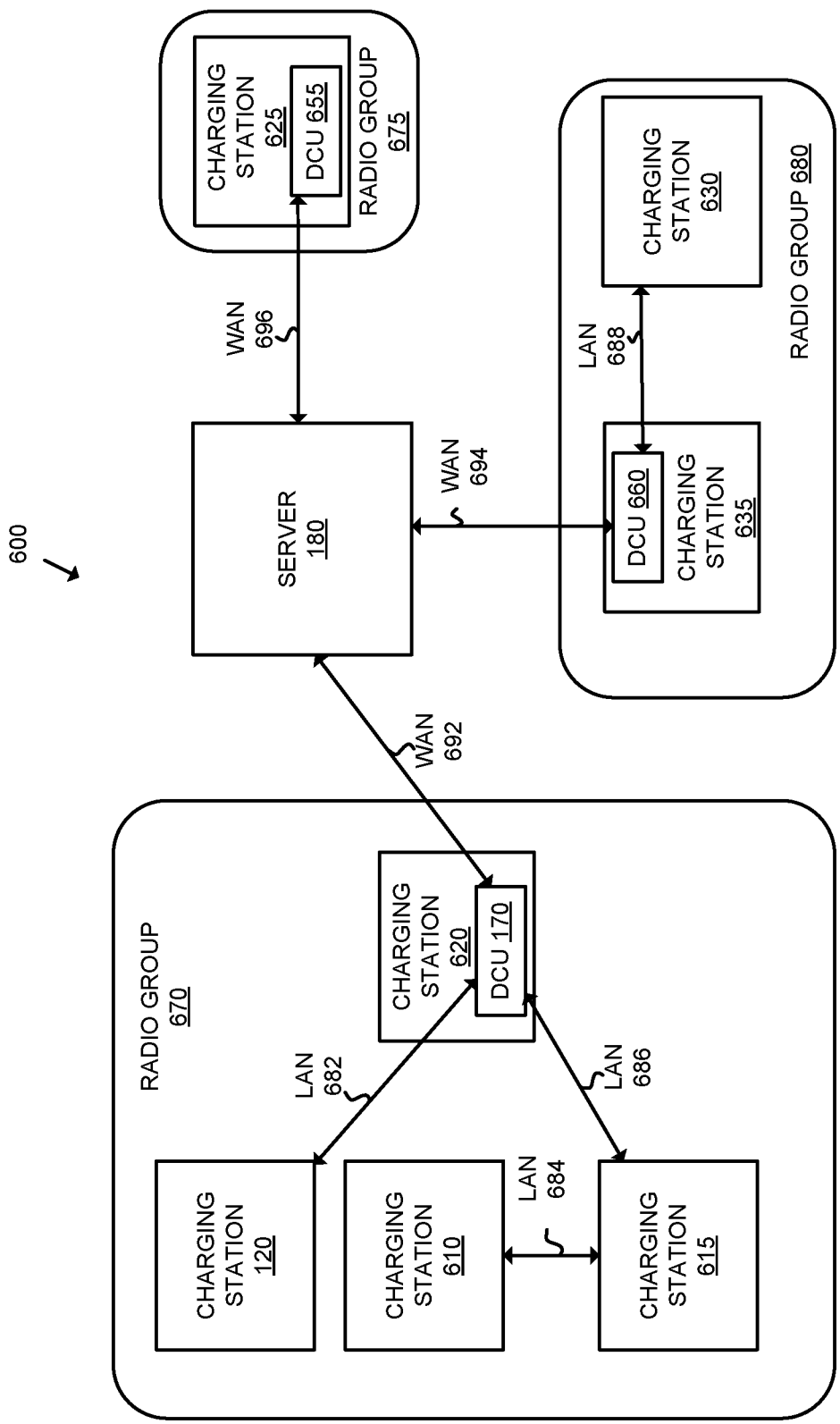
FIG. 6 illustrates an exemplary network of charging stations according to one embodiment of the invention.

While FIG. 1 illustrates a single charging station 120, it should be understood that many charging stations may be networked to the server 180 (through one or more data control units) and/or to each other. FIG. 6 illustrates an exemplary network of charging stations according to one embodiment of the invention. The charging station network 600 includes the server 180 and the charging stations 120, 610, 615, 620, 625, 630, and 635. The server 180 is providing services for each of the charging stations 120, 610, 615, 620, 625, 630, and 635. The charging stations 120, 610, 615, and 620 are part of the radio group 670. The charging stations 630 and 635 are part of the radio group 680. The charging station 625 is the only charging station in the radio group 675. As used herein, a radio group is a collection of one or more charging stations that collectively has a single connection to a server. Each radio group includes one or more data control units (DCUs) which connect the charging stations with the server. Typically, DCUs are implemented along with a charging station. However, a data control unit may be implemented separately from any charging station.

Each DCU acts as a gateway to the server 180 for those charging stations that are coupled with that DCU. It should be understood that charging stations need not have a direct link to a DCU (e.g., a charging station may be directly linked to another charging station which itself has a direct link to a DCU). For example, DCU 170 (of the radio group 670 and implemented in the charging station 620) is coupled with the server 180 through the WAN link 692 and is coupled with each of the charging stations 120, 610, and 615. The charging stations 120 and 615 are directly coupled with the DCU 170 via the LAN links 682 and 686 respectively. The charging station 610 is indirectly coupled with the DCU 170 via the LAN link 684 to the charging station 615 which is itself directly coupled with the DCU 170 via the LAN link 686. Thus, the charging stations 120, 610, and 615 transmit messages to, and receive messages from, the server 180 via the DCU 170. The DCU 625 (of the radio group 675 and part of the charging station 625) is coupled with the server 180 through the WAN link 696. The DCU 660 (of the radio group 680) is coupled with the server 180 through the WAN link 694 and is coupled with the charging station 630 via the LAN link 688.

Radio groups represent the network topology of a collection of charging stations. Typically, these charging stations are located relatively close (e.g., on the same street, in the same parking garage, in the same block, etc.). It should be understood that the network architecture illustrated in FIG. 6 is exemplary, and other architectures may be used in embodiments of the invention (e.g., each charging station may have a direct connection with the server 180).

Communicating over the LAN links is typically cheaper than communicating over the WAN links both in terms of speed and cost. For example, messages and data can typically be exchanged on the LAN links for free while exchanging messages and data over the WAN links costs money. In addition, messages and data can typically be exchanged over the LAN links more quickly and efficiently than exchanging data and messages over the WAN link. In some embodiments, the server 180 distributes charging system updates (e.g., software updates, firmware updates, etc.) only to the DCUs 170, 655, and 660 which then in turn distribute the updates to the charging stations in the radio groups 670, 675, and 680 respectively. In this way, the amount of data that is transferred on the relatively expensive WAN links is kept to a minimum.

Figure 7:
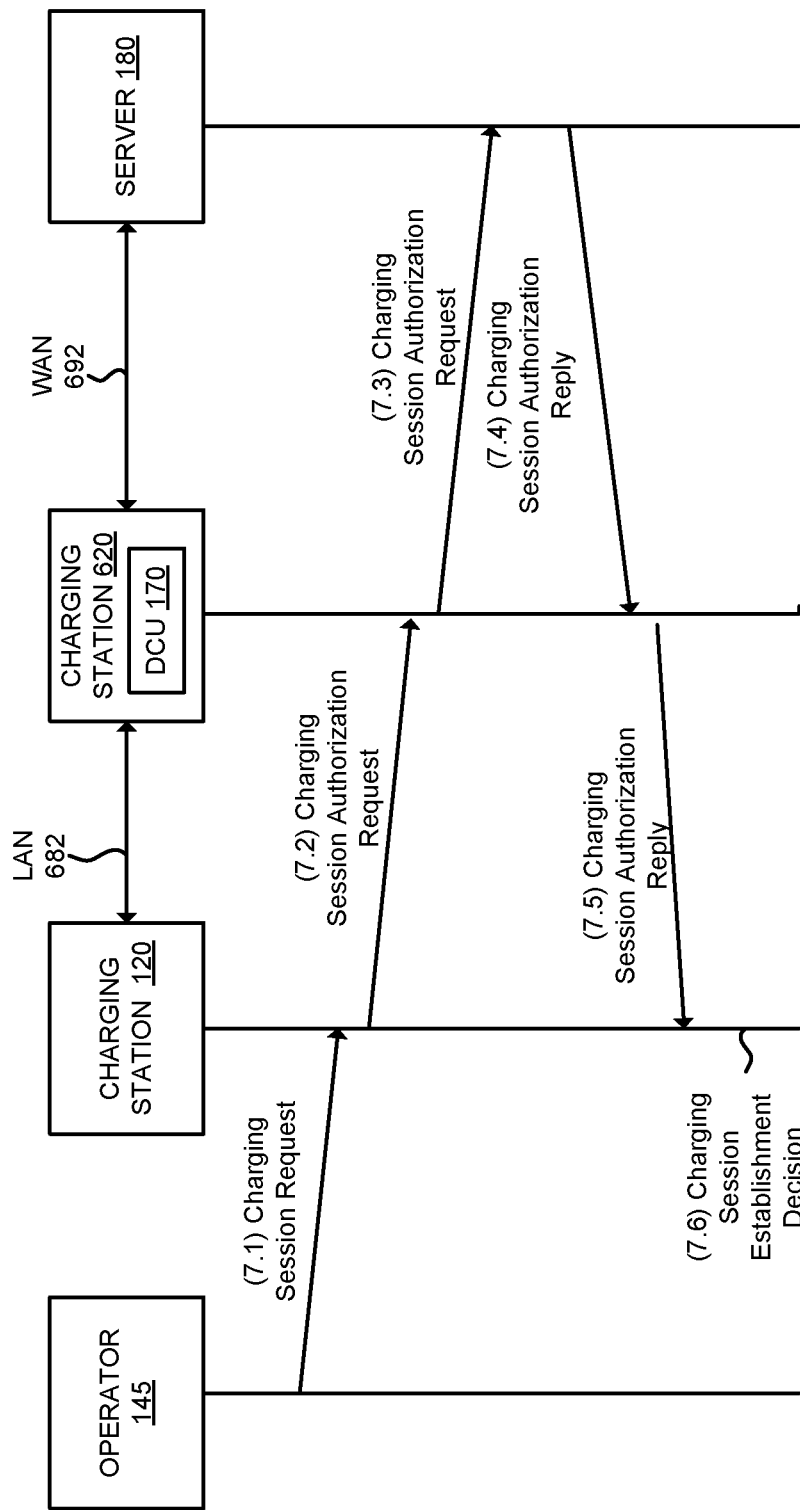
FIG. 7 illustrates an exemplary charging station network server that performs profile based authorization for charging sessions of a charging station that indirectly communicates with the server through a gateway data control unit according to one embodiment of the invention.

FIG. 7 illustrates the server performing authorization according to one embodiment of the invention for a charging station that indirectly communicates with the server 180. As illustrated in FIG. 7, the charging station 120 communicates with the server 180 through the DCU 170 (implemented within the charging station 620). The charging station 120 transmits and receives messages from the DCU 170 over the LAN link 682 and the DCU 170 transmits and receives messages from the server 180 over the WAN link 692 (e.g., a cellular connection such as CDMA, GPRS, etc.).

At operation 7.1, the charging station 120 receives a charging session request from the electric vehicle operator 145. The request may be received via the mobile communication device 150 or though other means. The charging session request will include an identifier that is associated with the electric vehicle operator 145. Sometime after receiving the charging session request, the charging station 120 generates a charging session authorization request and transmits the authorization request to the DCU 170 at operation 7.2. The charging session authorization request typically includes the identifier that associated with the electric vehicle operator 145. The authorization request can also include additional information (e.g., charging station identifier, time of day, etc.).

Sometime after receiving the charging session authorization request, the DCU 170 performs any necessary adjustments to the request message (e.g., encapsulation, etc.) and forwards the charging session authorization request to the server 180 at operation 7.3. Sometime after receiving the charging session authorization request from the DCU 170, the server 180 performs a profile based authorization process to determine whether the electric vehicle operator 145 is authorized to use the charging station 120. Sometime after performing the profile based authorization, the server 180 generates and transmits a charging session authorization reply to the DCU 170 at operation 7.4. Sometime after receiving the charging session authorization reply, the DCU 170 forwards the charging session authorization reply to the charging station 120 at operation 7.5 Sometime after receiving the charging session authorization reply, the charging station 120 determines whether to establish a charging session for the operator 145 (including energizing the charging point connection 155) based on the received charging session authorization reply at operation 7.6. If the charging session authorization reply indicates that the operator 145 is authorized to use the charging station 120, the charging station 120 establishes a charging session including energizing the charging point connection 155. If the charging session authorization reply indicates that the operator 145 is not authorized to use the charging station 120, the charging station 120 declines the charging session request (and thus does not energize the charging point connection 155).

While FIG. 7 includes a single hop between the charging station 120 and the server 180 (i.e., the charging station 620), embodiments of the invention are not so limited as any number of hops can exist between the charging station 120 and the server 180 (e.g., one or more other charging stations and/or one or more other DCUs).

Figure 8:
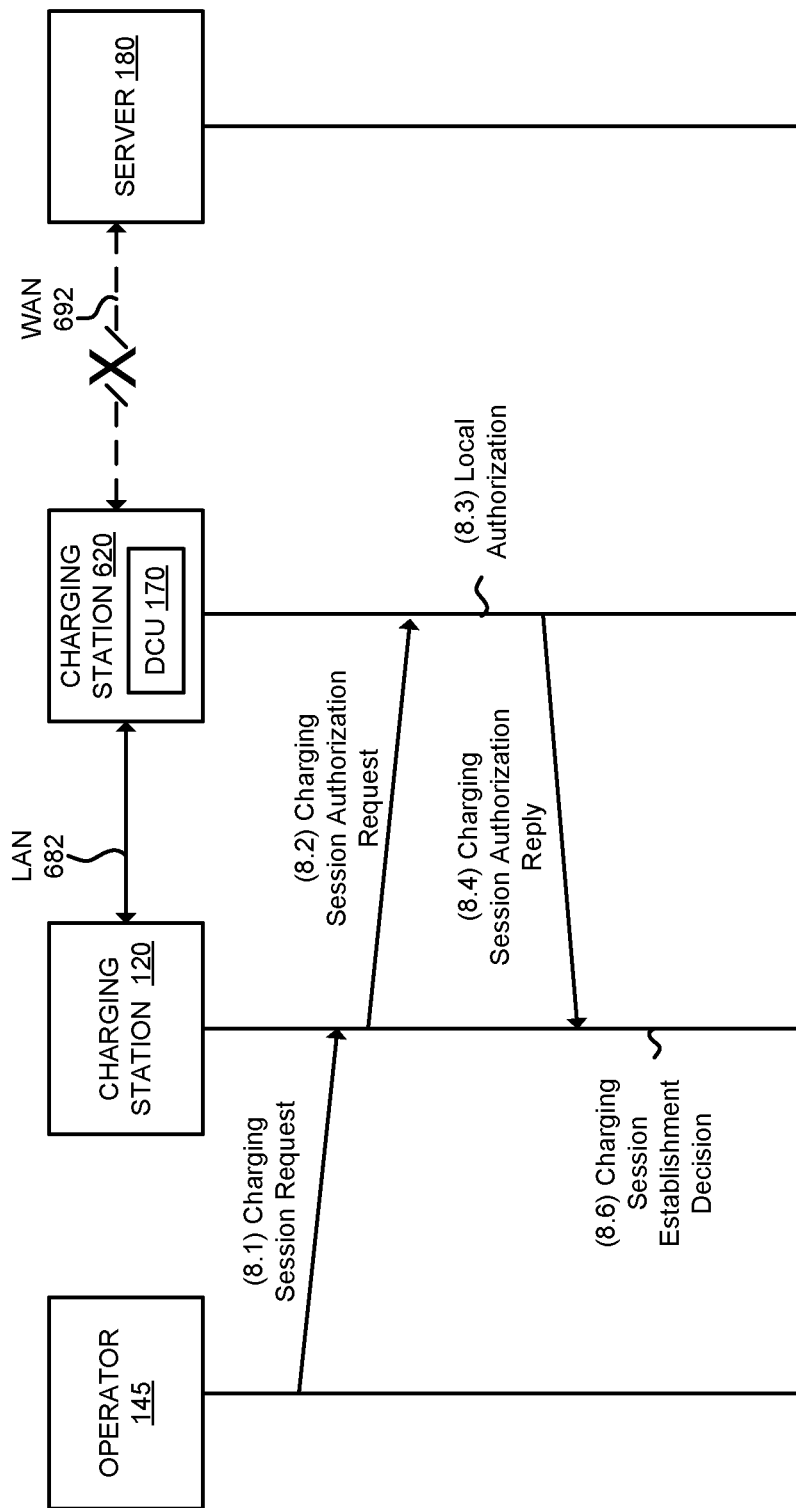
FIG. 8 illustrates an authorization procedure where a gateway data control unit has lost network connectivity with the charging station network server according to one embodiment of the invention.

FIG. 7 illustrates an authorization procedure when the charging station 120 has network connectivity to the server 180 (e.g., when the communication connection between the charging station 120 and the DCU 170 and the communication connection between the DCU 170 and the server 180 is operating correctly). In one embodiment, the DCU 170 performs a local authorization procedure if it loses network connectivity to the server 180 (e.g., the WAN link 692 is operating incorrectly). FIG. 8 illustrates an authorization procedure where the DCU has lost network connectivity with the server 180 according to one embodiment of the invention.

At operation 8.1, the charging station 120 receives a charging session request from the electric vehicle operator 145. The charging session request in operation 8.1 is similar to the charging session request received in operation 7.1 (e.g., the charging session request includes an identifier associated with the operator 145). Sometime after receiving the charging session request, the charging station 120 generates a charging session authorization request and transmits the authorization request to the DCU 170 at operation 8.2. The charging session authorization request typically includes the identifier that is associated with the electric vehicle operator 145. The authorization request can also include additional information (e.g., charging station identifier, time of day, etc.).

As illustrated in FIG. 8, the communication connection between the DCU 170 and the server 180 is down. Thus, at operation 8.3 the DCU 170 causes a local authorization procedure to be performed. In one embodiment, the local authorization procedure includes comparing the identifier included in the charging session request against one or more local authorization lists to determine whether to allow a charging session for the operator 145. While in one embodiment the server 180 distributes one or more local authorization lists to the DCU 170 that apply to each charging station of the radio group of the DCU 170 (e.g., the radio group 670 which includes the charging station 120, the charging station 610, and the charging station 615), in other embodiments the server 180 distributes one or more local authorization lists to the DCU 170 for each charging station in its radio group (e.g., one or more local authorization lists specific for the charging station 120, one or more local authorization lists specific for the charging station 610, etc). In one embodiment, the local authorization lists can include a list of identifiers that are authorized to use a charging station (i.e., a white list of identifiers). In another embodiment, the local authorization lists can include a list of identifiers that are not authorized to use a charging station (i.e., a blacklist of identifiers). In addition, in some embodiments, there may be different local authorization lists for different time periods of the day (e.g., lists for peak hours, lists for non-peak hours, lists for overnight hours, etc.). In some embodiments described with reference to FIG. 8, the server 180 distributes the local authorization list(s) only to the DCU 170 and not the charging station 120.

Sometime after performing the local authorization, the DCU 170 generates and transmits a charging session authorization reply to the charging station 120 at operation 8.4 Sometime after receiving the charging session authorization reply, the charging station 120 determines whether to establish a charging session for the operator 145 (including energizing the charging point connection 155) based on the received charging session authorization reply at operation 8.6.

In one embodiment, the charging station 120 performs a local authorization procedure if it loses network connectivity to the DCU 170 (e.g., the LAN link 682 is operating incorrectly). FIG. 9A illustrates an authorization procedure where the charging station 120 has lost network connectivity with the server 180 due to the communication connection between the charging station 120 and the DCU 170 operating incorrectly.

At operation 9.1, the charging station 120 receives a charging session request from the electric vehicle operator 145. The charging session request in operation 9.1 is similar to the charging session request received in operation 7.1 (e.g., the charging session request includes an identifier associated with the operator 145). Since the communication connection between the charging station 120 and the DCU 170 is down, at operation 9.2 the charging station 120 performs a local authorization procedure as similarly described with reference to operation 3.6 of FIG. 3B. The charging station 120 determines whether to grant the charging session request (allow a charging session to be established) at operation 9.3 based on the results of the local authorization procedure.

It should be understood that the local authorization procedure of operation 9.2 assumes that the charging station 120 has access to one or more local authorization lists. However, in some embodiments the charging station 120 does not have local access to local authorization lists (e.g., the local authorization lists are only distributed to the DCU 170). In such embodiments, the charging station 120 can be configured to grant all charging session requests. FIG. 9B illustrates the charging station 120 granting all charging session requests when it loses connectivity to the server 180. As illustrated in FIG. 9B, the communication connection between the charging station 120 and the DCU 170 is not operating correctly (e.g., the LAN link 682 is down). At operation 9.4, the charging station 120 receives a charging session request from the electric vehicle operator 145. The charging session request in operation 9.4 is similar to the charging session request received in operation 9.1. Since the communication connection between the charging station 120 and the DCU 170 is down, at operation 9.5 the charging station 120 grants the charging session request and establishes a charging session including energizing the charging point connection 155.

In some embodiments, when a charging station or a DCU is in a local authorization mode (e.g., network connectivity with the server is interrupted), the charging station or DCU stores state data related to each charging session. For example, the state data can include the identifier (e.g., the RFID number), the charging session duration, the amount of energy transferred (e.g., kWh), etc. When network connectivity is restored, the state data is transmitted to the server which then updates the profile associated with the identifier.

In some embodiments, the charging stations and/or data control units perform a restricted list authorization procedure to determine whether operators can potentially use the charging station. The restricted list authorization procedure can be performed prior to the profile based authorization procedure described herein.

In some embodiments, a set of one or more restricted lists are distributed to the charging stations and/or to the DCUs which can indicate whether vehicle operators are allowed to use the charging station. For example, similar to the local authorization lists described above, the set of restricted lists can include a list of identifiers that potentially can use the charging station (a whitelist) if otherwise authorized and/or a list of identifiers that are not authorized to use the charging station (a blacklist). In one embodiment, the restricted list(s) are specific to a specific time period. For example, a restricted list can apply during the day and a different restricted list can apply during overnight hours.

In addition, in some embodiments the restricted lists can indicate that a certain group of identifiers are potentially allowed to use (or not allowed to use) the charging stations. For example, in some embodiments the identifiers associated with vehicle operators are unique only to organizations, businesses, groups, departments, or other organizational sections. For instance, the RFID cards belonging to an organizational section can be programmed with the same password or other information. As an example, the vehicle operators for a police department can each be associated with the same identifier. In other embodiments, the identifiers associated with vehicle operators are unique to each vehicle operator but also include a portion that is common to an organization, business, group, department, locality, or other organizational section. Using a similar example as above, the vehicle operators for a police department can each share a portion of the identifier (e.g., an organizational portion of the identifier) and can each have a unique portion of the identifier. For example, the first N bits of the identifier can be dedicated for organizational sections while the remaining M bits can be used to identify individuals within that organizational section. The organizational section portion of the identifier can also be used to identify whether a vehicle operator is a home user whose account is not affiliated with a company or organization.

In some embodiments the charging stations can be configured to operate as a public charging station (available to any subscriber) during certain time periods of the day and operate as a private charging station (available only to certain subscribers) during other time periods of the day. For example, charging stations may be configured as operating in private mode during the day (e.g., during the workday) and public mode during evening and overnight hours, or vice versa. The set of restricted lists can identify whether a requesting vehicle operator is authorized to use the charging station during those times.

Figure 10:
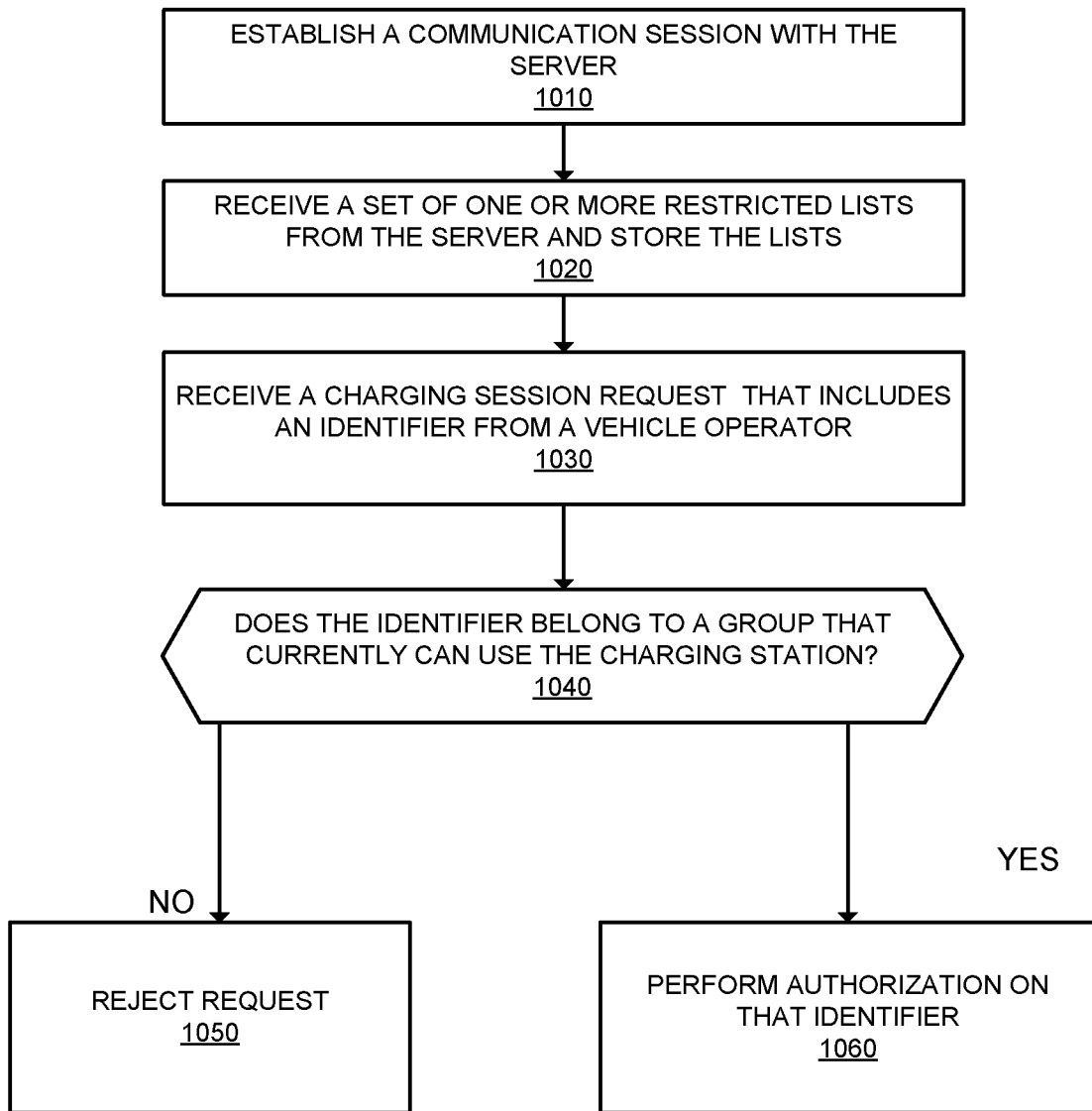
FIG. 10 is a flow diagram illustrating exemplary operations for performing a restricted authorization procedure according to one embodiment of the invention.

FIG. 10 is a flow diagram illustrating exemplary operations for performing a restricted authorization procedure according to one embodiment of the invention. FIG. 10 will be described with reference to the exemplary embodiment of FIG. 1. However, it should be understood that the operations of FIG. 10 can be performed by embodiments of the invention other than those discussed with reference to FIG. 1 and the embodiments discussed with reference to FIG. 1 can perform operations different than those discussed with reference to FIG. 10. According to one embodiment, the operations described in reference to FIG. 10 are performed by charging stations (e.g., the charging station 120).

According to one embodiment, the restricted list authorization procedure is an initial authorization procedure that is performed prior to the profile based authorization procedure previously described herein. In other embodiments, the restricted list authorization procedure is performed instead of the profile based authorization procedure described herein. At block 1010, the charging station 120 establishes a communication session with the server 180. Flow moves from block 1010 to block 1020, where the charging station 120 receives a set of one or more restricted lists from the server and stores those lists. Flow moves from block 1020 to block 1030 where the charging station 120 receives a charging session request that includes an identifier from a vehicle operator (e.g., the vehicle operator 145). The identifier is associated with the vehicle operator. Flow moves from block 1030 to block 1040.

At block 1040, the charging station 120 determines whether the received identifier belongs to a group that can currently use the charging station. For example, the charging station 120 accesses the set of restricted lists to compare the received identifier with the restricted lists. If the identifier is not associated with a group that can currently use the charging station (e.g., the charging station is currently in a private mode and the identifier is one that is not authorized to use the charging station in the private mode), then flow moves to block 1050 where the request is rejected. The vehicle operator can be notified that the request is rejected (e.g., through email, text message, updating of a microblogging account, etc.). If the identifier is associated with a group that can currently use the charging station (e.g., the charging station is currently in public mode or the charging station is in private mode and the identifier is one that is authorized to use the charging station in private mode), then flow moves to block 1060 where authorization is performed.

In an alternative embodiment, if the identifier belongs to a group that currently can use the charging station, the charging station 120 grants the request and allows a charging session to be established without requiring additional authorization of the block 1060.

Figure 11:
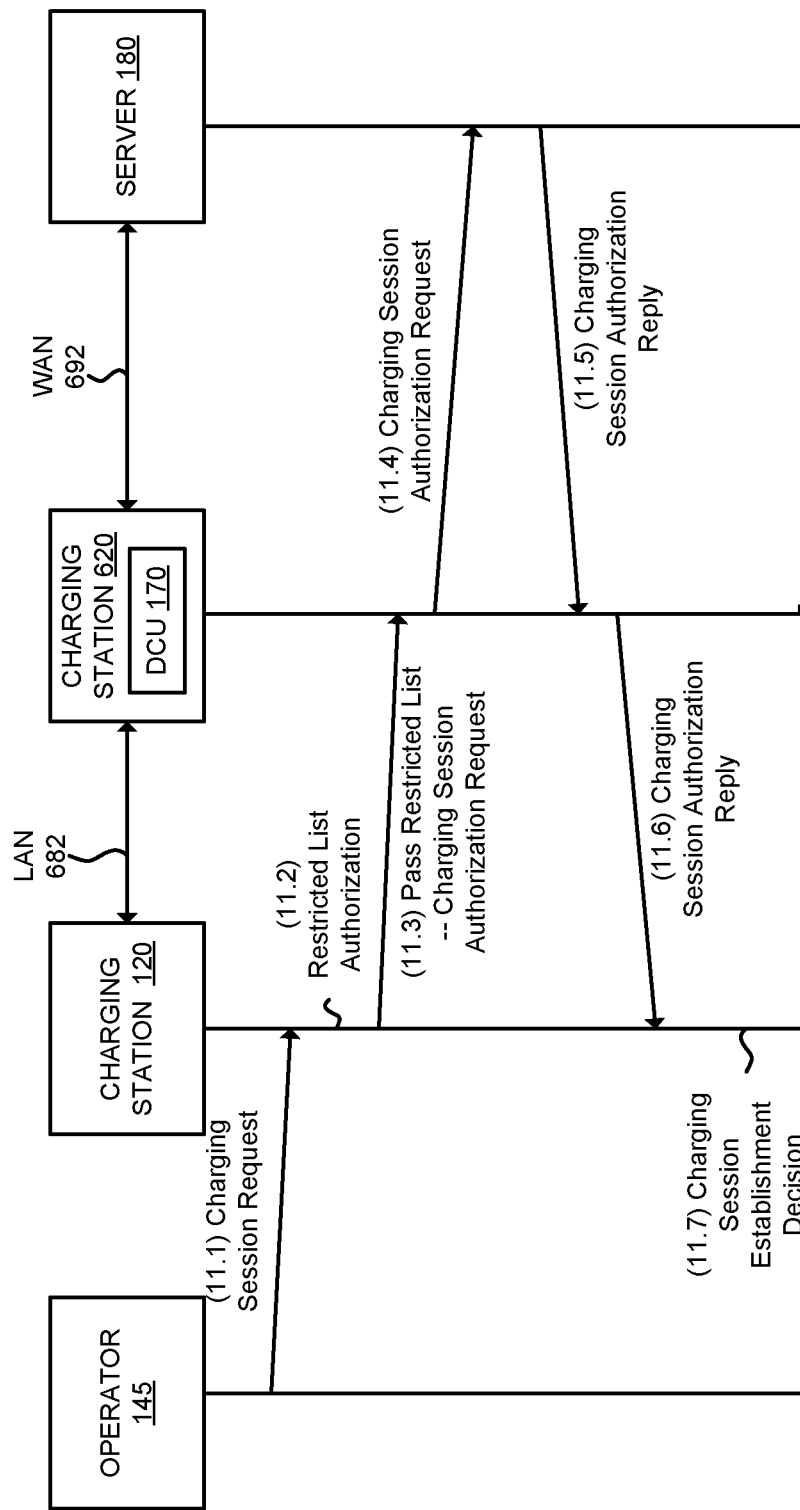
FIG. 11 illustrates a restricted list authorization procedure performed by a charging station according to one embodiment of the invention.

FIG. 11 illustrates a restricted list authorization procedure performed by a charging station according to one embodiment of the invention. The network architecture of FIG. 11 is similar to that of FIG. 7 described herein (i.e., the charging station 120 communicates with the server 180 through the DCU 170). As illustrated in FIG. 11, the charging station 120 has received a set of one or more restricted lists from the server 180.

At operation 11.1, the charging station 120 receives a charging session request from the electric vehicle operator 145. The request in operation 11.1 is similar to the request received in operation 7.1 described in FIG. 7. The request includes an identifier that is associated with the vehicle operator 145. The request may be received via the mobile communication device 150 or though other means. Sometime after receiving the charging session request, the charging station 120 performs a restricted list authorization procedure at operation 11.2.

The restricted list authorization procedure includes accessing one or more of the restricted list(s) to determine whether the operator 145 can potentially use the charging station 120 at the time of the request. For example, assume that the charging station 120 is currently operating in a private mode and only identifiers that belong to certain group(s) are allowed to use the charging station at this time (if otherwise authorized to use the charging station). If the identifier that is included in the charging session request does not belong to those certain group(s), then the request will be rejected. It should be understood that the request is rejected prior to any profile based authorization procedure being performed thereby avoiding a transmission of a charging session authorization request over the relatively expensive WAN link 692 to the server 180. If the identifier included in the charging session request belongs to those certain group(s) (i.e., the identifier passes the restricted list authorization procedure), then the authorization procedure continues at operation 11.3 where the charging station 120 generates and transmits a charging session authorization request to the DCU 170 to begin the profile based authorization procedure.

Thus, it should be understood that in some embodiments it is possible to pass the restricted list authorization procedure and fail the profile based authorization procedure described herein. For example, a vehicle operator can be associated with an identifier that passes the restricted list authorization procedure (e.g., the identifier belongs to a group of identifiers that can potentially use the charging station) but does not pass the profile based authorization procedure described herein (e.g., their account may not be in good standing, their account may not have a charging session remaining, etc.).

Sometime after receiving the charging session authorization request, the DCU 170 performs any necessary adjustments to the request message (e.g., encapsulation, etc.) and forwards the charging session authorization request to the server 180 at operation 11.4. Sometime after receiving the charging session authorization request from the DCU 170, the server 180 performs the profile based authorization process as described herein. Sometime after performing the profile based authorization, the server 180 generates and transmits a charging session authorization reply to the DCU 170 at operation 11.5. Sometime after receiving the charging session authorization reply, the DCU 170 forwards the charging session authorization reply to the charging station 120 at operation 11.6 Sometime after receiving the charging session authorization reply, the charging station 120 determines whether to establish a charging session for the operator 145 (including energizing the charging point connection 155) based on the received charging session authorization reply at operation 11.7.

While FIG. 11 includes a single hop between the charging station 120 and the server 180 (i.e., the charging station 620), embodiments of the invention are not so limited as any number of hops can exist between the charging station 120 and the server 180 (e.g., one or more other charging stations and/or one or more other DCUs).

Figure 12:
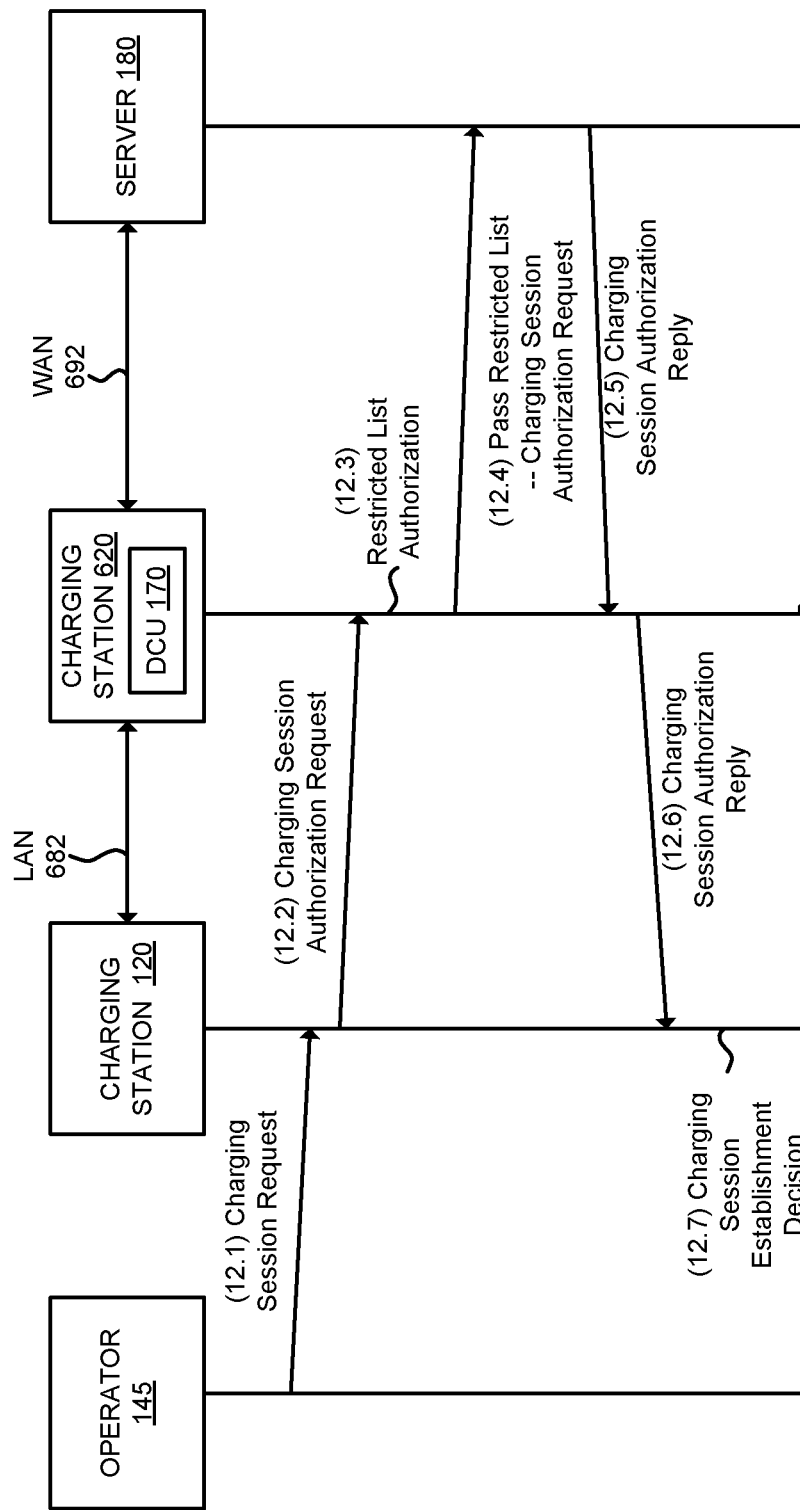
FIG. 12 illustrates a restricted list authorization procedure performed by a gateway data control unit according to one embodiment of the invention.

While FIG. 11 illustrates a restricted list authorization procedure performed by a charging station, in some embodiments the restricted list authorization procedure is performed by the DCUs. FIG. 12 illustrates a restricted list authorization procedure performed by the DCU 170 according to one embodiment of the invention. The operations described in reference to FIG. 12 are similar to that of FIG. 11 with the exception that the restricted list authorization procedure is performed by the DCU 170 instead of the charging station 120. In such an embodiment, the DCU 170 receives a set of one or more restricted lists from the server 180 (e.g., one or more restricted lists for each of charging stations within the radio group 670).

At operation 12.1, the charging station 120 receives a charging session request from the electric vehicle operator 145. The request in operation 12.1 is similar to the request received in operation 11.1 described in FIG. 11. The request includes an identifier that is associated with the vehicle operator 145. The request may be received via the mobile communication device 150 or though other means. Sometime after receiving the charging session request, the charging station 120 generates and transmits a charging session authorization request to the DCU 170 at operation 12.2. The charging session authorization request includes the identifier that was included in the charging session request.

Sometime after receiving the charging session authorization request, the DCU 170 performs a restricted list authorization procedure at operation 12.3. The restricted list authorization procedure includes accessing one or more of the restricted list(s) to determine whether the operator 145 can potentially use the charging station 120 at the time of the request. If the identifier included in the charging session request belongs to those certain group(s) (i.e., the identifier passes the restricted list authorization procedure), then the authorization procedure continues at operation 12.4 where the DCU 170 generates and transmits a charging session authorization request to the server 180 for a profile based authorization procedure.

Sometime after receiving the charging session authorization request from the DCU 170, the server 180 performs the profile based authorization process as described herein. Sometime after performing the profile based authorization, the server 180 generates and transmits a charging session authorization reply to the DCU 170 at operation 12.5. Sometime after receiving the charging session authorization reply, the DCU 170 forwards the charging session authorization reply to the charging station 120 at operation 12.6 Sometime after receiving the charging session authorization reply, the charging station 120 determines whether to establish a charging session for the operator 145 (including energizing the charging point connection 155) based on the received charging session authorization reply at operation 12.7.

In some embodiments the one or more authorization lists and/or the one or more restricted lists are in a compressed format (e.g., a bloom filter, a bitmap, etc.). In some embodiments, the one or more authorization lists and/or the one or more restricted lists are specific to a service provider. For example, assume that the vehicle operator 145 does not have an account with the owner/operator of the charging station 120 but rather has an account with a different electric vehicle charging service provider that has a roaming agreement with the owner/operator of the charging station 120. In such a case, one or more authorization lists and/or one or more restricted lists can be distributed from that different electric vehicle charging service provider to the charging station 120 and/or the DCU 170.

In some embodiments the charging stations can be configured to operate in a free mode for certain users and operate in a commercial mode for other users. As an example, the charging stations belonging to an employer can be configured to operate in free mode for their employees and operate in commercial mode (where users are charged for their current usage) for non-employees. In such an embodiment, the charging stations can store a list of identifiers that are authorized to use the charging stations (i.e., a whitelist of identifiers) regardless of the status of network connectivity; while requests with identifiers not on the list are transmitted to the server for authorization and accounting.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A networked electric vehicle charging station for charging electric vehicles, comprising:
   a charging point connection to couple electric vehicles to a power line coupled with a power grid;
   an electricity control device coupled with the charging point connection to control a flow of electricity to the charging point connection;
   a first transceiver to communicate directly with an electric vehicle charging station network server;
   a second transceiver to communicate with another electric vehicle charging station that does not have a direct connection with the electric vehicle charging station network server;
   a charging station controller coupled with the electricity control device, a current measuring device, the first transceiver, the second transceiver, and a data store, the charging station controller to perform the following:
      receive charging session authorization requests each including an identifier from that another electric vehicle charging station;
   a data control unit coupled with the charging station controller, the data control unit to perform the following:
      for those charging session requests that are received from the another electric vehicle charging station while a communication connection between the networked electric vehicle charging station and the electric vehicle charging station network server is operating correctly, performing the following for each of those charging session requests:
         transmit a charging session authorization request to the electric vehicle charging station network server for profile based authorization, and
         receive a charging session authorization reply from the electric vehicle charging station network server that indicates whether to grant or deny that charging session request, wherein when transmitted to the another electric vehicle charging station, the charging session authorization reply causes that another electric vehicle charging station to energize the charging point connection responsive to the charging session authorization reply indicating a granting of that charging session request;
      for those charging session requests that are received from the another electric vehicle charging station while the communication connection between the networked electric vehicle charging station and the electric vehicle charging station network server is not operating correctly, performing the following for each of those charging session requests:
         perform a local authorization procedure for that charging session request based on the identifier included in that charging session request;
         for those charging session requests that pass the local authorization procedure, sending a first local authorization reply to the another electric vehicle charging station indicating a charging session authorization; and
         for those charging session request that fail the local authorization procedure, sending a second local authorization reply to the another electric vehicle charging station indicating a charging session rejection.

2. The networked electric vehicle charging station of claim 1, further comprising:
   a data store coupled with the charging station controller, the data store to store one or more local authorization lists to be used by charging station controller during performance of the local authorization procedure; and
   wherein the local authorization procedure for each charging session request includes a comparison of the identifier included in that charging session request with the one or more local authorization lists to determine whether to grant or deny the charging session request.

3. The networked electric vehicle charging station of claim 2, wherein the one or more local authorization lists are whitelists.

4. The networked electric vehicle charging station of claim 2, wherein the one or more local authorization lists are blacklists.

5. The networked electric vehicle charging station of claim 2, further comprising:
   the second transceiver to receive current data from the another electric vehicle charging station, the current data including a measure of an electric current flowing on the power line through the charging point connection of the another electric vehicle charging station;
   wherein while the communication connection between the networked electric vehicle charging station and the electric vehicle charging station network server is interrupted, the charging station controller is to store the current data along with other charging session data from the another electric vehicle charging station; and
   the charging station controller to transmit the stored current data from the another electric vehicle charging station to the electric vehicle charging station network server responsive to the communication connection between the networked electric vehicle charging station and the electric vehicle charging station network server being restored.

6. A method in a networked electric vehicle charging station, comprising:
   receiving, from another electric vehicle charging station, a first charging session authorization request from that another electric vehicle charging station, the first charging session authorization request including a first identifier;
   while a communication connection between the networked electric vehicle charging station and an electric vehicle charging station network server is operating correctly, performing the following for the first charging session authorization request:

transmitting the first charging session authorization request to the electric vehicle charging station network server for profile based authorization, and receiving a first charging session authorization reply from the electric vehicle charging station network server that indicates whether to grant or deny that charging session request, wherein when transmitted to the another electric vehicle charging station, the charging session authorization reply causes that another electric vehicle charging station to energize a charging point connection responsive to the charging session authorization reply indicating a granting of the first charging session authorization request;

receiving, from that another electric vehicle charging station, a second charging session authorization request from that another electric vehicle charging station, the second charging session authorization request including a second identifier; and while the communication connection between the networked electric vehicle charging station and the electric vehicle charging station network server is not operating correctly, performing the following for the second charging session authorization request:

performing a local authorization procedure for that charging session request based on the identifier included in that charging session request, and sending a first local authorization reply to the another electric vehicle charging station indicating a granting or denial of the second charging session authorization request.

7. The method of claim 6, further comprising:

accessing a data store storing one or more local authorization lists to be used by a charging station controller during performance of the local authorization procedure; and comparing the second identifier included in the second charging session authorization request with the one or more local authorization lists to determine whether to grant or deny the second charging session authorization request.

8. The method of claim 7, wherein the one or more local authorization lists are whitelists.

9. The method of claim 7, wherein the one or more local authorization lists are blacklists.

10. The method of claim 6, further comprising:

receiving current data from the another electric vehicle charging station, the current data including a measure of an electric current flowing on a power line through a charging point connection of the another electric vehicle charging station;

wherein while the communication connection between the networked electric vehicle charging station and the electric vehicle charging station network server is interrupted, storing the current data along with other charging session data from the another electric vehicle charging station; and transmitting the stored current data from the another electric vehicle charging station to the electric vehicle charging station network server responsive to the communication connection between the networked electric vehicle charging station and the electric vehicle charging station network server being restored.

11. A networked electric vehicle charging station, comprising:

a processor; and a non-transitory machine-readable storage medium that stores instructions that, when executed by the processor, cause the networked electric vehicle charging station to perform operations including:

receiving, from another electric vehicle charging station, a first charging session authorization request from that another electric vehicle charging station, the first charging session authorization request including a first identifier;

while a communication connection between the networked electric vehicle charging station and an electric vehicle charging station network server is operating correctly, performing the following for the first charging session authorization request:

transmitting the first charging session authorization request to the electric vehicle charging station network server for profile based authorization, and receiving a first charging session authorization reply from the electric vehicle charging station network server that indicates whether to grant or deny that charging session request, wherein when transmitted to the another electric vehicle charging station, the charging session authorization reply causes that another electric vehicle charging station to energize a charging point connection responsive to the charging session authorization reply indicating a granting of the first charging session authorization request;

receiving, from that another electric vehicle charging station, a second charging session authorization request from that another electric vehicle charging station, the second charging session authorization request including a second identifier; and while the communication connection between the networked electric vehicle charging station and the electric vehicle charging station network server is not operating correctly, performing the following for the second charging session authorization request:

performing a local authorization procedure for that charging session request based on the identifier included in that charging session request, and sending a first local authorization reply to the another electric vehicle charging station indicating a granting or denial of the second charging session authorization request.

12. The networked electric vehicle charging station of claim 11, wherein the operations further comprise:

accessing a data store storing one or more local authorization lists to be used by a charging station controller during performance of the local authorization procedure; and comparing the second identifier included in the second charging session authorization request with the one or more local authorization lists to determine whether to grant or deny the second charging session authorization request.

13. The networked electric vehicle charging station of claim 12, wherein the one or more local authorization lists are whitelists.

14. The networked electric vehicle charging station of claim 12, wherein the one or more local authorization lists are blacklists.

15. The networked electric vehicle charging station of claim 11, wherein the operations further comprise:

receiving current data from the another electric vehicle charging station, the current data including a measure of an electric current flowing on a power line through a charging point connection of the another electric vehicle charging station;

wherein while the communication connection between the networked electric vehicle charging station and the electric vehicle charging station network server is interrupted, storing the current data along with other charging session data from the another electric vehicle charging station; and transmitting the stored current data from the another electric vehicle charging station to the electric vehicle charging station network server responsive to the communication connection between the networked electric vehicle charging station and the electric vehicle charging station network server being restored.

\* \* \* \* \*